United States Patent [19]

Takeuchi et al.

[11] Patent Number: 4,990,934

[45] Date of Patent: Feb. 5, 1991

[54] RECORDING HEAD HAVING A HEAT DISSIPATING ELECTRICALLY INSULATING LAYER DISPOSED BETWEEN RECORDING AND RETURN ELECTRODES

[75] Inventors: Yukihisa Takeuchi; Toshikazu Hirota; Shigeki Okada; Natsumi Shimogawa, all of Nagoya, Japan

[73] Assignee: NGK Insulators, Ltd., Aichi, Japan

[21] Appl. No.: 407,432

[22] Filed: Sep. 6, 1989

[30] Foreign Application Priority Data

Sep. 9, 1988 [JP] Japan ................................ 63-226799

[51] Int. Cl.$^5$ ................................................ G01D 15/10

[52] U.S. Cl. ................................ 346/76 PH; 400/120

[58] Field of Search ............ 346/76 PH; 219/216 PH; 400/120

[56] References Cited

U.S. PATENT DOCUMENTS

| | | | |
|---|---|---|---|
| 3,968,500 | 7/1976 | Meisel et al. | 346/139 C |
| 4,082,619 | 4/1978 | Dehnert | 346/165 |
| 4,595,823 | 6/1986 | Sorimachi et al. | 346/76 PH |
| 4,612,433 | 9/1986 | Nagaoka et al. | 346/76 PH |
| 4,684,960 | 8/1987 | Nishiwaki | 346/76 PH |
| 4,865,339 | 7/1989 | Kato | 219/216 PH |

FOREIGN PATENT DOCUMENTS

| | | | |
|---|---|---|---|
| 0150579 | 8/1985 | European Pat. Off. . | |
| 3008498 | 1/1981 | Fed. Rep. of Germany . | |
| 3435999 | 4/1985 | Fed. Rep. of Germany . | |
| 3447581 | 7/1985 | Fed. Rep. of Germany . | |
| 0063287 | 5/1980 | Japan | 346/76 PH |
| 0154186 | 12/1980 | Japan | 346/76 PH |
| 58-12790 | 1/1983 | Japan . | |
| 58-104787 | 6/1983 | Japan . | |
| 59-169872 | 9/1984 | Japan . | |
| 60-174664 | 1/1985 | Japan . | |
| 60-199669 | 9/1985 | Japan . | |
| 61-35972 | 2/1986 | Japan . | |
| 61-37493 | 2/1986 | Japan . | |
| 61-230966 | 10/1986 | Japan . | |
| 0099162 | 5/1987 | Japan . | |
| 62-292461 | 12/1987 | Japan . | |
| 63-30279 | 2/1988 | Japan . | |
| 63-87264 | 4/1988 | Japan . | |
| 63-160855 | 7/1988 | Japan . | |
| 1000761 | 2/1983 | U.S.S.R. | 346/76 PH |

*Primary Examiner*—Mark J. Reinhart

*Assistant Examiner*—Huan Tran

*Attorney, Agent, or Firm*—Parkhurst, Wendel & Rossi

[57] ABSTRACT

A recording head operable to apply an electric current, having at least a plurality of recording electrodes and at least one return circuit electrode, which are held in contact with a sheet having at least an electrically resistive layer which generates heat upon energization thereof through the recording and return circuit electrodes. The recording head has an insulating layer including an electrically insulating material and at least one metallic sheet positioned in the electrically insulating material. This insulating layer is disposed between an array of the plurality of recording electrodes and the return circuit electrode or electrodes, so as to form a multi-layer structure which includes the recording electrodes, return circuit electrodes(s) and insulating layer. The recording and return circuit electrodes are formed of an electrically conductive material which has a higher degree of water resistance than that of the insulating layer.

16 Claims, 1 Drawing Sheet

RECORDING HEAD HAVING A HEAT DISSIPATING ELECTRICALLY INSULATING LAYER DISPOSED BETWEEN RECORDING AND RETURN ELECTRODES

BACKGROUND OF THE INVENTION

1. Field of the Invention

The present invention relates generally to a recording head for recording or printing images such as characters, figures, or graphical patterns, by applying an electric current to a ribbon or sheet (or film), or to a recording medium More particularly, the invention is concerned with a multi-layer structure including a plurality of electrodes for locally energizing the sheet or recording medium.

2. Discussion of the Prior Art

Various structures or arrangements of electrodes used for recording heads have been proposed, for applying an electric current to effect a recording operation. Examples of such recording heads are disclosed in laid-open Publication Nos. 61-35972, 58-12790, 61-230966, and 62-292461 of unexamined Japanese Patent applications. These recording heads have an array of recording electrodes formed in one plane, and a return circuit electrode layer or an array of return circuit electrodes formed in another plane parallel to the plane of the recording electrodes. The recording heads are operated such that the recording and return circuit electrodes formed in the two spaced-apart planes are held in contact with a sheet having at least an electrically resistive layer which generates heat for printing upon energization thereof. According to the arrangements as disclosed in these publications, an electrically insulating layer is disposed between the array of recording electrodes and the return circuit electrode layer or the array of return circuit electrodes. Thus, the recording head has a multi-layer structure including the insulating layer.

In the recording head having a multi-layer structure as described above, the recording and return circuit electrodes must be positioned with a high degree of accuracy, so as to provide a constant spacing between the recording electrodes and the return circuit electrode or electrodes in the direction of thickness of the recording head. This aims at preventing crosstalk between the electrodes, and assuring high degrees of uniformity and reproducibility of images printed in a matrix of dots corresponding to the recording electrodes.

Further, laid-open Publication No. 63-87264 of unexamined Japanese Patent application discloses a recording head adapted to apply an electric current to effect a recording operation, by using a heat-sensitive or thermosensive paper. On the other hand, laid-open Publication Nos. 58-104787, 61-37493, 63-160855 and 63-30279 of unexamined Japanese Patent applications disclose recording heads for applying an electric current to an ink layer or a heat-sensitive layer which is formed on the surface of a sheet, ribbon, web, roller or other support member, or which forms an inner layer of the support member. The ink layer may be an electrically conductive layer, an electrically resistive layer or electro-chemical reaction layer. The heat-sensitive layer may contain an electrolyte and produces a color due to exposure to heat. In these publications indicated above, there is no description of a multi-layered recording head in which the array of recording electrodes are spaced by a suitable distance from that of return circuit electrodes or single return electrode layer, as described above. However, the electrothermal printing by such a multi-layered recording head may be effected by using a heat-sensitive paper, electrically resistive ink layer, or heat-sensitive coloring layer, as indicated in the above publications. In this case, too, the spacing between the recording electrodes and the return circuit electrode(s) should be accurately controlled as in the case described above.

For assuring a stable permanent electrical contact between the electrodes of the recording head and the electrically resistive layer of the support member for local energization of the latter, the electrically insulating layer interposed between the recording and return circuit electrodes is required to be made of a material having a lower degree of wear resistance than that of the electrodes. The insulating layer also needs to have considerably high heat resistance, so as to prevent deterioration of its electrically insulating property and a chronological change in the thickness of the layer, due to heat generated by the electrically resistive layer, which leads to deterioration in the quality of printed or transferred images on a recording medium.

In the case of a high-speed recording operation, an ink material transferred to the recording medium is likely to blot or run, due to accumulative heat generated at the electrically resistive layer of the support member during an excess length of time, to thereby obscure the transferred images in a matrix of dots. For avoiding this, the heat generated at the electrically resistive layer should be dissipated in a short time, through the insulating layer disposed between the electrodes such that the insulating layer functions as a heatsink or heat dissipator for absorbing and dissipating the heat.

Since conventional recording heads of a multi-layer structure including recording and return circuit electrodes use an electrically insulating layer made solely of a resin material such as epoxy resin and polyimide, such recording heads are not satisfactory in terms of the heat resistance and heat dissipation.

There are also known recording heads which use an electrically insulating layer made of an ordinary glass or ceramic material. While such an insulating layer has a sufficiently high degree of heat resistance, the insulating layer is incapable of effectively dissipating heat generated during a recording operation. In addition, since the insulating layer made of the materials indicated above has a higher degree of wear resistance than that of the electrodes, the known recording head suffers from a poor electrical contact of the electrodes with the electrically resistive layer of the support member. Thus, it is difficult to obtain an optimum relative wear resistance between the insulating layer and the electrodes.

Where the electrically insulating layer is formed of mica, the layer has a high degree of heat resistance and sufficient electrically insulating capability. However, the insulating layer formed of the ordinary mica may not have sufficient uniformity in the thickness, which determines the spacing between the recording and return circuit electrodes. Consequently, the recording head having such an insulating layer suffers from deterioration in the quality of the transferred images. In addition, the insulating layer made of mica is not satisfactory in terms of heat dissipating capability.

SUMMARY OF THE INVENTION

The present invention was developed in view of the above problems or drawbacks encountered in the prior art as described above. It is accordingly an object of the present invention to provide a recording head operable to apply an electric current, which has a multi-layer structure including a plurality of recording electrodes and at least one return circuit electrode, and which has improved heat resistance, sufficient electrical insulation between the electrodes, and a stable permanent electrical contact between the electrodes and an electrically resistive layer of a support member, thereby permitting a high-speed recording operation with improved quality of recorded images.

The above object may be achieved according to the principle of the present invention, which provides a recording head operable to apply an electric current, having at least a plurality of recording electrodes and at least one return circuit electrode, which are held in contact with a sheet having at least an electrically resistive layer which generates heat upon energization thereof through the recording and return circuit electrodes. The recording head comprises an insulating layer including an electrically insulating material and at least one metallic sheet positioned in the electrically insulating material. The insulating layer is disposed between an array of the plurality of recording electrodes and the above-indicated at least one return circuit electrode, so as to form a multi-layer structure which includes the recording electrodes, the above-indicated at least one return circuit electrode and the electrically insulating layer. The recording electrodes and the return circuit electrode or electrodes are formed of an electrically conductive material which has higher degree of wear resistance than that of the electrically insulating layer.

In the recording head of the present invention having a multi-layer structure including the highly wear-resistant recording and return circuit electrodes, at least one metallic sheet (or foil, film or the like) incorporated in the electrically insulating layer disposed between the electrode layers contributes to accurately positioning the recording and return circuit electrodes with a constant spacing therebetween, thereby permitting a good contact between each electrode and the electrically resistive layer of the sheet. The use of the metallic sheet according to the invention is also effective to prevent the insulating layer from losing its electrically insulating capability due to heat generated by the resistive layer, and to avoid a chronological change in the thickness of the insulating layer, which has adverse influences on the recording head. Further, the present invention enjoys an advantage that the heat generated at electrical contact portions between the recording head and the resistive layer can be effectively dissipated through the at least one metallic sheet which has higher thermal conductivity than resin, glass, mica or other material conventionally used for the insulating layer. Thus, the recording head according to the present invention permits a high-speed recording operation with high operating reliability and improved quality of the recorded images.

According to the invention, the electrodes of the recording head, i.e., the recording and return circuit electrodes, which are generally supported by respective substrates, are made of an electrically conductive material which has higher wear resistance than the substrates and the insulating layer. More specifically, metals such as chromium, titanium, tantalum, and zirconium, alloys containing at least one of these metals, and compounds of these metals are preferably used as a major component of the electrically conductive material for the electrodes, since these metals, alloys and compounds have high resistance to mechanical, wear, and are less likely to be consumed due to electrical activities. Among the metals indicated above, chromium metals, or alloys or compounds containing chromium are preferably used as a major component of the electrically conductive material for the electrodes. More preferably, the electrodes are made of an electrically conductive material which contains chromium and nitrogen. The recording and return circuit electrodes made of the above materials generally have a thickness of at least 1 micron, and the surface of each electrode may be coated with a plating of nickel, copper or gold, as needed.

According to one form of the present invention, the recording head includes a first and a second substrate for supporting the recording electrodes and return circuit electrode(s), respectively. It is desirable that these substrates are easier to wear than the electrodes formed thereon. More specifically, the substrates are preferably formed of a ceramic material which has high heat resistance, and has lower hardness and lower wear resistance than those of the material for the electrodes. In particular, a highly machinable glass ceramic containing mica is preferred for the substrates.

The electrically insulating layer of the instant recording head is interposed between the recording and return circuit electrodes such that the at least one metallic sheet is embedded as an intermediate layer in the electrically insulating material including resins such as epoxy resin and polyimide, that is, such that the at least one metallic sheet is spaced apart from the recording and return circuit electrodes, by the masses of the electrically insulating material interposed between the metallic sheet(s) and the electrodes. The insulating layer incorporating the at least one metallic sheet in such a manner exhibits an optimum wear resistance as compared with the combination of the materials of the electrodes and the substrates as described above, thereby permitting a better contact between the electrodes and the resistive layer, which leads to high quality of recorded images. Since the insulating layer including the metallic sheet(s) is elastic, and highly heat-resistant enough to resist heat of a temperature of 300° C. or higher, the recording head of the invention is capable of applying suitable amounts of printing pressure and heat to the ink layer even at a high recording speed. Further, the insulating layer of the instant recording head is adapted to effectively dissipate heat generated at the resistive layer, whereby the transferred images in a matrix of dots are prevented from blotting or running on the recording medium.

The metallic sheet of the insulating layer is generally formed of a metal or an alloy, preferably formed of a material having lower hardness than the electrodes. More specifically, it is desirable that the sheet consists of a metal or alloy including Cu, Al, Ni, Sn, Pb, Fe, Zn or other elements. Further, it is preferred in terms of insulating reliability and durability of the insulating layer, that the surface of the metallic sheet is oxidized before the sheet is embedded in the electrically insulating material, so as to form an oxide film (insulating film) on the sheet surface. This formation of the oxide film on the surface of the metallic sheet may be accomplished by a chemical reaction process, such as oxygen plasma treating, heat treatment under an oxidizing atmosphere, or anodization, or other various oxidizing techniques. Among these methods, the oxygen plasma treating is most preferred, which permits easy formation of the oxide film with relatively high density and uniformity. The metallic sheet is also advantageous in the uniformity of its thickness. The thickness of the sheet is generally within a range of about 20–500 microns. The electrically insulating layer including the metallic sheet(s) as its intermediate layer has a total thickness within a range of about 30–550 microns, depending upon the thickness of the metallic sheet.

In fabricating the multi-layer structure of the recording head according to the present invention, a substrate which supports each of the two arrays of electrodes formed thereon may be superposed on the insulating layer including the at least one metallic sheet. In this case, a suitable adhesive consisting of an inorganic material or a resin material may be used to bond the substrates and the insulating layer with each other. The bonding is also possible by using a molten glass as an adhesive, or by using a jig for mechanically fixing the substrates and the insulating layer to each other. It is to be understood that the adhesive or glass material used in the following embodiments forms a part of the insulating layer.

According to an alternative method of fabricating the multi-layer structure, the electrically insulating layer having at least one intermediate metal sheet is superposed on a substrate supporting a plurality of recording electrodes formed in an array, and subsequently, at least one return circuit electrode is formed on the insulating layer, or another substrate with the return circuit electrode(s) formed thereon is superposed on the insulating layer. The above-indicated, at least one return circuit electrode may be a planar common electrode which takes the form of a layer having no pattern, or may be an array of separate electrodes in the form of spaced-apart strips. The planar common electrode is generally formed of an electrically conductive metal or alloy material. The configuration of the return circuit electrode(s) is suitably selected depending on a desired recording head.

BRIEF DESCRIPTION OF THE DRAWINGS

The above and optional objects, features and advantages of the present invention will be better understood by reading the following detailed description of presently preferred embodiments, when considered in connection with the accompanying drawings, in which.

DETAILED DESCRIPTION OF THE PREFERRED EMBODIMENTS

To further clarify the concept of the present invention, preferred embodiments of the invention will be described. However, it is to be understood that the invention is not limited to the details of these illustrated embodiments, but may be embodied with various changes, modifications and improvements which may occur to those skilled in the art, without departing from the spirit and scope of the invention defined in the appended claims.

Figure 1:
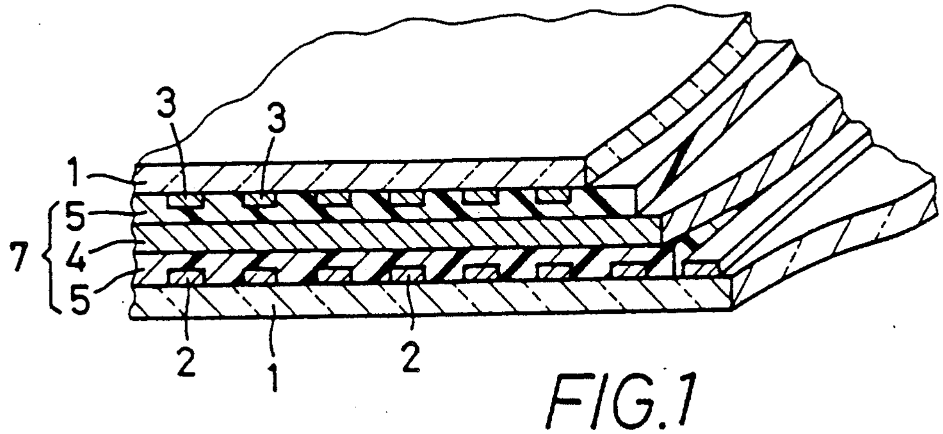
FIG. 1 is a schematic perspective view of a front portion of a recording head constructed according to one embodiment of the invention.

Referring first to FIG. 1, there is shown a recording head which has a laminar or multi-layer structure including two substrates 1. Each substrate 1 is formed of a highly machinable, glass ceramic containing mica. On the facing surfaces of the substrates 1, there are respectively formed an array of 480 parallel strip-like recording electrodes 2 and an array of corresponding return circuit electrodes 3. Each array is formed from a film of chromium which is sputtered on the substrate 1, subjected to a photo-etching process well known in the art, and then heat treated. Each recording electrode 2 has a width of 100 microns and a thickness of 6 microns, and the electrodes 2 are equally spaced apart from each other at a pitch of 170 microns (distance between centers of the adjacent electrodes 2). Between the two arrays of the recording electrodes 2 and the return circuit electrodes 3, there is disposed an electrically insulating layer 7 which includes two generally planar electrically insulating masses 5 made of an epoxy resin, and an intermediate metal sheet 4 having a thickness of 50 microns and high heat conductivity. The metal sheet 4 is sandwiched between the two planar insulating masses 5. In other words, the metal sheet 4 is interposed between the arrays of the recording and return circuit electrodes 2, 3 via the insulating masses 5. The insulating masses 5 also serve as an adhesive for bonding or fixing the recording and return circuit electrodes 2, 3 and the intermediate metal sheet 4.

Figure 2:
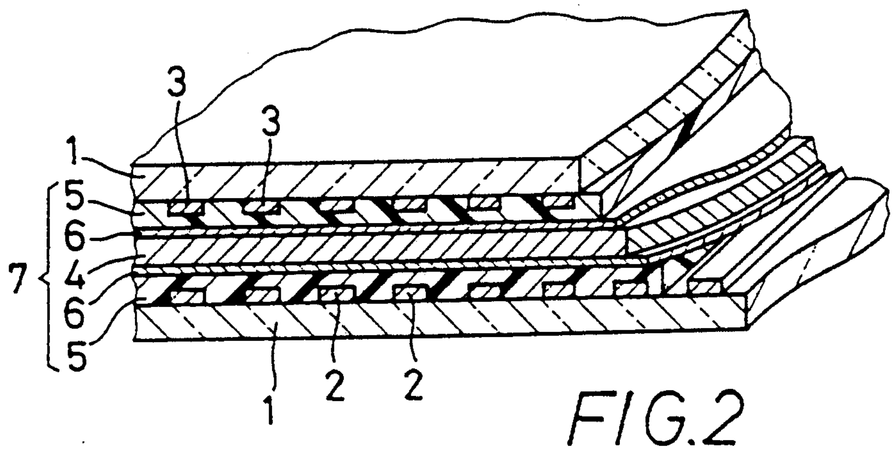
FIG. 2 is a schematic perspective view of a front portion of a recording head constructed according to another embodiment of the invention.

Referring next to FIG. 2, there is shown another embodiment of the invention, wherein the recording head uses a metal sheet 4 whose opposite surfaces are preliminarily oxidized. In this figure, reference numeral 6 denotes superficial oxide films, which are formed by oxidizing the surfaces of the metal sheet 4, such that each oxide film is interposed between the metal sheet 4 and the appropriate insulating mass 5. In this embodiment, the electrically insulating layer 7 is constituted by the metal sheet 4, electrically insulating masses 5, and oxide films 6.

EXAMPLES

Two specimens of recording head (specimens 1 and 2) were prepared, according to the construction as shown in FIG. 1 in which the surfaces of the metal sheet 4 were not oxidized. These two specimens had different kinds of metal sheets 4 disposed between the insulating masses 5. Three other specimens of recording head (specimens 3 through 5) were prepared, according to the construction as shown in FIG. 2 in which the surfaces of the metal sheet 4 were preliminarily oxidized. These three specimens utilized different oxidizing methods for oxidizing the surfaces of the metal sheet 4. These methods will be described in detail. For specimen 3, the metal sheet 4 was prepared from a copper plate, which was exposed to oxygen plasma under 0.9 Torr, for forming the oxide films on the surfaces of the sheet. For specimen 4, the metal sheet 4 in the form of a copper plate was subjected to heat treatment under a $N_2$ gas including 2% by volume of oxygen, at a temperature of 250° C. For specimen 5, the metal sheet 4 was prepared from an aluminum plate, which was anodized by immersing the sheet in a solution including 14% by weight of sulfuric acid. In these manners, the opposite surfaces of each metal sheet 4 of specimens 3–5 were oxidized.

For each of the recording heads (specimens 1–5) constructed as described above, a distance between each recording electrode and the corresponding return circuit electrode in the direction of thickness of the multi-layer structure, i.e., a sum of the thickness of the metal sheet (4, 6) and the insulating masses (5) was measured. The results of the measurements were indicated in Table 1. As a comparative example, there was prepared a recording head (specimen 6) which was not provided with a metal sheet, but consisted solely of an insulating layer disposed between the arrays of the electrodes 2, 3, which was formed of an epoxy resin. The result of the measurement on this comparative example was also indicated in Table 1.

TABLE 1

| Specimen No. | Metal Sheet (Thickness) | Insulating Layer | Fig. | Distance between Electrodes |
|---|---|---|---|---|
| 1 | Copper (50 μm) | Epoxy resin | 1 | 100 ± 7 μm |
| 2 | Aluminum (50 μm) | Epoxy resin | 1 | 96 ± 7 μm |
| 3 | Copper (Oxidized) (50 μm) | Epoxy resin | 2 | 102 ± 8 μm |
| 4 | Copper (Oxidized) (50 μm) | Epoxy resin | 2 | 101 ± 10 μm |
| 5 | Aluminum (Oxidized) (50 μm) | Epoxy resin | 2 | 95 ± 12 μm |
| Comparative | | | | |
| 6 | None | Epoxy resin | | 85 ± 20 μm |

The recording heads of specimens 1–6 were tested on recording devices incorporating these recording heads. In the test, the recording head was continuously moved with its electrodes 2, 3 held in sliding contact with an electrically resistive layer of a film, so as to carry out a recording operation, and a change in the quality of recorded images was observed. The test showed remarkably clear, sharp high-density images printed by the recording devices incorporating the recording heads of specimens 1–5. This means that the metal sheet 4 embedded in the insulating layer is effective to provide considerably high quality of recorded images.

In the case of the recording head of comparative specimen 6 which did not have the metal sheet as used in specimens 1–5, the ink material transferred to a recording medium tended to run due to heat accumulated between the electrodes, during a high-speed recording operation. Even in a low-speed recording operation, the dots produced by the recording head of specimen 6 were found to be obscure, resulting in insufficient clearness of the obtained images, as compared with those obtained by the recording heads of the invention having the metal sheet. Further, the recording head of specimen 6 suffered from unfavorable variation (±20 μm) in the distance between the electrodes, which were considered to cause poor printed images consisting of dots whose profiles varied from one to another.

It will be understood from the foregoing description that the insulating layer which includes at least one metallic sheet having high heat conductivity is provided so as to allow dissipation of heat from a portion of the recording head between the recording and return circuit electrodes, to thereby permit printing of clear images which are devoid of blotting of the ink materials. Further, the uniformity in the thickness of the metallic sheet gives improved accuracy in the distance between the recording and return circuit electrodes, resulting in enhanced stability of the shapes or profiles of dots which constitute the printed images. Thus, the recording head constructed according to the present invention permits a high-speed recording operation while assuring high quality of recorded images and high operating reliability.

What is claimed is:

1. A recording head operable to apply an electric current, having at least a plurality of recording electrodes and at least one return circuit electrode, which are held in contact with a sheet having at least an electrically resistive layer which generates heat upon energization thereof through said recording and return circuit electrodes said recording head comprising:
   - an insulating layer including an electrically insulating material and at least one metallic sheet positioned in said electrically insulating material, said insulating layer being disposed between an array of said plurality of recording electrodes and said at least one return circuit electrode, so as to form a multi-layer structure which includes said recording electrodes, said at least one return circuit electrode and said insulating layer;
   - said recording electrodes and said at least one return circuit electrode being formed of an electrically conductive material which has a higher degree of wear resistance than that of said insulating layer.

2. A recording head according to claim 1, wherein said multi-layer structure further comprises a first and a second substrate which comprise a material having a lower degree of wear resistance than said recording and return circuit electrodes, said array of the recording electrodes being formed from a film applied to said first substrate while said at least one return circuit electrode being formed from a film applied to said second substrate, such that said insulating layer including said at least one metallic sheet is interposed between said array of the recording electrodes and said at least one return circuit electrodes.

3. A recording head according to claim 2, wherein said at least one return circuit electrode consists of a single planar common electrode consisting of said film applied to said second substrate.

4. A recording head according to claim 2, wherein said at least one return circuit electrode consists of an array of return circuit electrodes which is formed from said film applied to said second substrate.

5. A recording head according to claim 2, wherein said first and second substrates comprise a highly machinable glass ceramic material which contains mica.

6. A recording head according to claim 1, wherein said at least one metallic sheet of said insulating layer has opposite surfaces which are oxidized before said at least one metallic sheet is embedded in the insulating layer.

7. A recording head according to claim 1, wherein said at least one metallic sheet of said insulating layer comprises a material having lower hardness than said recording and return circuit electrodes.

8. A recording head according to claim 1, wherein said at least one metallic sheet of said insulating layer comprises a metal or an alloy including at least one element selected from the group consisting of Cu, Al, Ni, Sn, Pb, Fe and Zn.

9. A recording head according to claim 1, wherein said at least one metallic sheet of said insulating layer has a thickness of 20–500 microns.

10. A recording head according to claim 1, wherein said insulating layer including said at least one metallic sheet has a total thickness of 30–550 microns.

11. A recording head according to claim 1, wherein said at least one return circuit electrode consists of a single planar common electrode.

12. A recording head according to claim 1, wherein said electrically insulating material comprises resin.

13. A recording head according to claim 12, wherein said electrically insulating material comprises epoxy resin.

14. A recording head according to claim 12, wherein said electrically insulating material comprises polyimide.

15. A recording head according to claim 1, wherein said electrically insulating material consists of two generally planar masses in which said recording electrodes and said at least one return circuit electrode are embedded, respectively, said at least one metallic sheet being sandwiched between said two generally planar masses of said electrically insulating material.

16. A recording head according to claim 15, wherein said insulating layer further comprises bonding films between said at least one metallic sheet and said two generally planar masses of said electrically insulating material.

* * * * *